(12) United States Patent
Kobayashi et al.

(10) Patent No.: US 8,994,306 B2
(45) Date of Patent: Mar. 31, 2015

(54) SYSTEM AND METHOD FOR ISOLATING THE UNDRIVEN VOLTAGE OF A PERMANENT MAGNET BRUSHLESS MOTOR FOR DETECTION OF ROTOR POSITION

(71) Applicant: Cirrus Logic, Inc., Austin, TX (US)

(72) Inventors: Marc John Kobayashi, Tucson, AZ (US); Jason William Lawrence, Austin, TX (US); Stephen James Sanchez, Tucson, AZ (US); John L. Melanson, Austin, TX (US); Miroslav Oljaca, Tucson, AZ (US)

(73) Assignee: Cirrus Logic, Inc., Austin, TX (US)

( * ) Notice: Subject to any disclaimer, the term of this patent is extended or adjusted under 35 U.S.C. 154(b) by 103 days.

(21) Appl. No.: 13/835,101

(22) Filed: Mar. 15, 2013

(65) Prior Publication Data

US 2013/0342145 A1    Dec. 26, 2013

Related U.S. Application Data

(63) Continuation-in-part of application No. 13/800,327, filed on Mar. 13, 2013.

(60) Provisional application No. 61/651,736, filed on May 25, 2012.

(51) Int. Cl.
*H02P 1/04* (2006.01)
*H02P 6/18* (2006.01)

(52) U.S. Cl.
CPC ............... *H02P 6/183* (2013.01); *H02P 6/185* (2013.01)
USPC ............ 318/400.33; 318/400.13; 318/400.32; 318/400.34

(58) Field of Classification Search
USPC ............. 318/400.13, 400.32, 400.33, 400.34, 318/400.2, 253
See application file for complete search history.

(56) References Cited

U.S. PATENT DOCUMENTS

| | | | | |
|---|---|---|---|---|
| 5,202,614 | A * | 4/1993 | Peters et al. | 318/400.05 |
| 5,202,616 | A * | 4/1993 | Peters et al. | 318/400.09 |
| 5,382,889 | A * | 1/1995 | Peters et al. | 318/400.06 |
| 5,751,131 | A * | 5/1998 | Sears et al. | 318/778 |
| 5,808,440 | A * | 9/1998 | Bennett et al. | 318/778 |
| 6,285,149 | B1 * | 9/2001 | Brenden et al. | 318/400.04 |

(Continued)

OTHER PUBLICATIONS

Wang, et al,"A Position Detection Strategy for Sensorless Surface Mounted Permanent Magnet Motors at Low Speed Using Transient Finite-Element Analysis" IEEE Transactions on Magnetics, vol. 48 No. 2, Feb. 2012, pp. 1003-1006.

(Continued)

*Primary Examiner* — Paul Ip
(74) *Attorney, Agent, or Firm* — Hayes Soloway PC

(57) ABSTRACT

The system and method disclose for the controlling of sequential phase switching in driving a set of stator windings of a multi-phase sensorless brushless permanent magnet DC motor. A motor controller controls a power stage that drives two windings of a set of three windings in the motor with pulse width modulated signal. A plurality of voltage values on an undriven winding of the set of three windings are sampled within a window of time, wherein a period beginning when the driven windings are energized and ending when the driven windings are de-energized encompasses the window of time. The sampled voltage values are processed. When the processed voltage values exceed a threshold, the motor controller changes which two windings are driven.

26 Claims, 12 Drawing Sheets

(56) References Cited

U.S. PATENT DOCUMENTS

| | | | |
|---|---|---|---|
| 6,323,610 B1* | 11/2001 | Ng et al. | 318/400.2 |
| 6,437,525 B1* | 8/2002 | Menegoli | 318/400.13 |
| 6,493,169 B1* | 12/2002 | Ferris et al. | 360/73.03 |
| 6,534,936 B2* | 3/2003 | Messenger et al. | 318/400.35 |
| 6,653,805 B2* | 11/2003 | Menegoli | 318/400.13 |
| 6,703,805 B2* | 3/2004 | Griffitts | 318/459 |
| 6,885,163 B2 | 4/2005 | Heidrich | |
| 6,901,212 B2* | 5/2005 | Masino | 318/400.35 |
| 6,982,534 B2 | 1/2006 | Hahn et al. | |
| 6,998,799 B2* | 2/2006 | Rote et al. | 318/400.13 |
| 7,030,582 B2* | 4/2006 | Masino | 318/400.26 |
| 7,042,180 B2 | 5/2006 | Terry et al. | |
| 7,072,778 B2* | 7/2006 | Swanson | 702/57 |
| 7,122,980 B2 | 10/2006 | Kuroshima et al. | |
| 7,239,098 B2* | 7/2007 | Masino | 318/400.35 |
| 7,274,161 B2 | 9/2007 | Mori et al. | |
| 7,486,037 B2 | 2/2009 | Noh | |
| 7,489,097 B2 | 2/2009 | Fu et al. | |
| 7,777,436 B2* | 8/2010 | Brown et al. | 318/400.01 |
| 7,944,163 B2 | 5/2011 | Okumura | |
| 8,018,188 B2 | 9/2011 | Schwarzkopf et al. | |
| 8,040,095 B2 | 10/2011 | Berto | |
| 8,054,024 B2 | 11/2011 | Hayashi et al. | |
| 8,212,508 B2* | 7/2012 | Paintz et al. | 318/400.34 |
| 8,237,385 B2* | 8/2012 | Street | 318/400.34 |
| 8,456,117 B2* | 6/2013 | Paintz | 318/400.34 |
| 2002/0079852 A1* | 6/2002 | Menegoli | 318/254 |
| 2002/0084760 A1* | 7/2002 | Messenger et al. | 318/439 |
| 2003/0193306 A1* | 10/2003 | Griffitts | 318/459 |
| 2003/0231875 A1* | 12/2003 | Masino | 388/928.1 |
| 2004/0061458 A1* | 4/2004 | Rote et al. | 318/254 |
| 2004/0070356 A1* | 4/2004 | Masino | 318/439 |
| 2004/0131342 A1* | 7/2004 | Masino | 388/800 |
| 2005/0283324 A1* | 12/2005 | Swanson | 702/57 |
| 2007/0031131 A1* | 2/2007 | Griffitts | 388/811 |
| 2009/0096397 A1* | 4/2009 | Paintz et al. | 318/400.35 |
| 2009/0218974 A1* | 9/2009 | Paintz | 318/400.35 |
| 2010/0007297 A1* | 1/2010 | Brown et al. | 318/400.32 |
| 2010/0060217 A1 | 3/2010 | Ikeda et al. | |
| 2010/0066287 A1* | 3/2010 | Street | 318/400.34 |
| 2010/0141191 A1* | 6/2010 | Chen et al. | 318/400.33 |
| 2010/0194329 A1 | 8/2010 | Lu et al. | |
| 2010/0207562 A1 | 8/2010 | Spirk et al. | |

OTHER PUBLICATIONS

Johnson et al, "Review of Sensorless Methods for Brushless DC", Copyright 1999 IEEE, pp. 143-150.

Ogasawara et al, "An Approach to Position Sensorless Drive for Brushless DC Motors", Copyright 1990 IEEE, pp. 443-447.

Holtz, "Initial Rotor Polarity Detection and Sensorless Control of PM Synchronous Machines", Copyright 2006 IEEE, pp. 2040-2047.

Chang et al, "A New Sensorless Starting Method for Brushless DC Motors without Reversing Rotation", Copyright 2007 IEEE, pp. 619-624.

Personn et al, "A New Standstill Position Detection Technique for Nonsalient Permanent-Magnet Synchronous Motors Using the Magnetic Anisotropy Method", Copyright Feb. 2007 IEEE Transaction on Magnetics, col. 43, No. 2, pp. 554-560.

Nakashima et al, "Sensorless Initial Rotor Position Estimation of Surface Permanent-Magnet Synchronous Motor", Copyright Nov./Dec. 2000, IEEE Transaction on Industry Applications, vol. 36, No. 6, pp. 1598.

Tanaka et al, "Initial Rotor Position Estimation for Surface Permanent Magnet Synchronous Motor", Copyright 2001 IEEE, pp. 2592.

Tursini et al, "Initial Rotor Position Estimation Method for PM Motors", Copyright Nov./Dec. 2003, IEEE Transactions on Industry Applications, vol. 39 No. 6, pp. 1630-1640.

Lee et al, "A New Starting Method of BLDC Motors Without Position Sensor", Copyright Nov./Dec. 2006 IEEE Transactions of Industry Applications, vol. 42 No. 6, pp. 1532.

Lee et al, "A New Starting Method of BLDC Motors without Position Sensor", Copyright 2004 IEEE, pp. 2397-2402.

Ha et al, "Sensorless Field-Orientation Control of an Induction Machine by High-Frequency Signal Injection", Copyright Jan./Feb. 1999, IEEE Transactions on Industry Applications, vol. 35 No. 1, pp. 45-51.

Jeong et al, "Initial Rotor Position Estimation of an Interior Permanent-Magnet Synchronous Machine Using Carrier-Frequency Injection Methods", Copyright Jan./Feb. 2005, IEEE Transactions on Industry Applications, vol. 41 No. 1, pp. 38-45.

Wijenayake et al, "Modeling and Analysis of Permanent Magnet Synchronous Motor by Taking Saturation and Core Loss into Account", Copyright 1997 IEEE, pp. 530-534.

Schmidt et al, "Initial Rotor Angle Detection of a Non-Salient Pole Permanent Magnet Synchronous Machine", Copyright Oct. 1997, IEEE Industry Application Society Annual Meeting, pp. 459-463.

Jang et al, "Position Detection and Start-up Algorithm of a Rotor in a Sensorless BLDC Motor Utilising Inductance Variation". IEE Proc.-Electr. Power Appl., vol. 149, No. 2, Mar. 2002.

Nakashima et al, "Sensorless Initial Rotor Position Estimation of Surface Permanent Magnet Synchronous Motor", Copyright 1999 IEEE, pp. 525-527.

Sugawata et al, "A Novel and Simple Initial Rotor Position Detecting Method for PMSMs", Copyright 2005 IEEE PEDS, pp. 612-617.

Li et al, "Modeling of Cross-Coupling Magnetic Saturation in Signal-Injection-Based Sensorless Control of Permanent-Magnet Brushless AC Motors", Copyright Jun. 2007, IEEE Transactions on Magnetics, vol. 43 No. 6, pp. 2552-2554.

Consoli et al, "Sensorless Control of PM Synchronous Motors at Zero Speed", Copyright 1999 IEEE, pp. 1033-1040.

Ichikawa et al, "Sensorless Control of Permanent-Magnet Synchronous Motors Using Online Parameter Identification Based on System Identification Theory", Copyright Apr. 2006, IEEE Transactions on Industrial Electronics, vol. 53 No. 2, pp. 363-372.

Scaglione et al, "PM Motor Sensorless Position Detection based on Iron B-H Local Hysteresis"(Switzerland 2000), 6 pages.

Hung et al, "Fuzzy Gain Scheduling PI Controller for a Sensorless Four Switch Three Phase BLDC Motor", Copyright 2010 IEEE, pp. 420-424.

* cited by examiner

SYSTEM AND METHOD FOR ISOLATING THE UNDRIVEN VOLTAGE OF A PERMANENT MAGNET BRUSHLESS MOTOR FOR DETECTION OF ROTOR POSITION

CROSS-REFERENCE

This application is a Continuation in Part to U.S. application entitled "Circuit and Method for Sensorless Control of a Permanent Magnet Brushless Motor During Start-up," having Ser. No. 13/800,327 filed Mar. 13, 2013 and claims the benefit of U.S. Provisional Application entitled, "Circuit and Method for Sensorless Control of a Brushless Motor During Start-up," having Ser. No. 61/651,736, filed May 25, 2012, which is entirely incorporated herein by reference.

FIELD

The present disclosure is generally related to motor controllers, and more particularly is related to a system and method for sensorless control of a permanent magnet brushless motor during start-up.

BACKGROUND

Sensored brushless motor technology is well-known and is useful for minimal flaw control at low speeds and reliable rotation. A sensored system has one or more sensors that continuously communicate with a motor controller, indicated to it what position the rotor is in, how fast it is turning, and whether it is going forward or reverse. Sensors in a sensored system increase cost and provide additional pieces that can break or wear down, adding durability and reliability issues. Sensorless systems can read pulses of current in the power connections to determine rotation and speed. Sensorless systems tend to be capable of controlling motors at higher speeds (e.g., revolutions per minute ("RPM")), but may suffer jitters under a load at very low starting speeds, resulting in a performance inferior to sensored brushless motors.

Jitter is a phenomenon that occurs with sensorless brushless motor systems at initial starting speed and generally no longer exists after the motor has gained sufficient speed. Jitter comes about because at low or zero speed, the sensorless algorithm does not have enough information to decide which windings to energize and in what sequence. One common solution for starting a sensorless system is to energize one winding pair to lock the rotor at a known position. The motor windings are then commutated at a pre-defined rate and PWM duty cycle until the rotor reaches a speed sufficiently high for the sensorless control to engage. However, even this solution will cause jitter during startup, particularly if there are time varying loads. Jitter can be decreased or made imperceptible for loads with minimal initial torque or predictable initial torque. However, some motor application/use situations (such as starting an electric motor bike moving uphill) demand significant torque for initiation, and the initial torque is highly unpredictable. Use of sensorless brushless motor systems is sometimes discouraged for low-speed high-torque maneuvers, like rock-crawling or intricate and detailed track racing of an electric motor vehicle/bike, because in such difficult situations, significant jittering may occur and can lead to premature motor burnout.

FIG. 1 is a block diagram of a motor control system 10 in a three-phase power stage, as is known in the prior art. Many three-phase motor control systems 10 include a controller having a control signal generator 12, a gate driver 14, and a power stage 16. In case of sensorless control, feedback circuits are also included, specifically a detection network 18 and a current sensing circuit 20, which utilizes sense resistor $R_{SENSE}$. In general, a goal of sensorless control is to detect a motor response to an applied pulse width modulated (PWM) source voltage to identify rotor position and movement.

Similarly, a current sense circuit 20 may be used to detect the magnitude and direction of motor current across driven windings. Low side shunt monitoring is used regularly. An often used configuration for low side monitoring is shown in FIG. 1. One skilled in the art can easily adopt alternative current sensing techniques such as monitoring phase current in each inverter branch including high-side monitoring and this alternative technique is known to those having ordinary skill in the art.

The control signal generator 12 is often powered from a low voltage source. As a result, a function of the gate driver 14 includes shifting the low voltage control signals to levels that match input requirements of the power stage 16. The power stage 16 includes semiconductor switching devices. MOSFETs are shown in FIG. 1, but other devices such as IGBTs may be used. The control signal can be made to generate trapezoidal (a.k.a. block or 6 step commutation) or sinusoidal drive from the power source $V_{pwr}$. Pulse width modulation is typically used with trapezoidal drive in brushless DC (BLDC) motor control. Systems requiring lower audible noise or lower torque ripple benefit from sinusoidal drive.

Those skilled in the art with respect to PWM drive techniques understand a variety of modes to generate trapezoidal, sinusoidal, or other control. The motor response to a PWM drive can be detected via voltage on the motor phases and/or phase current(s).

As shown in FIG. 1 for a brushless DC motor control, the power stage 16 is driven such that current flows into a first motor phase (for example, phase U) and exits a second motor phase (for example, phase V). The rotor (not shown) position within the motor 30 dictates which phase pair to drive to attempt to achieve full torque and smooth (jitter-free) rotation of the rotor. The feedback controls are used to deduce rotor position.

FIG. 2 is an illustration of a wye-connected motor 30, as is known in the prior art. The wye-connected motor 30 in this illustration has a single-pole pair permanent magnet rotor 32 positioned such that its south pole 34 is proximate to the winding of the U-phase 36. Under these conditions, it is obvious to one skilled in the art that the W-phase 38 and the V-phase 40 are the appropriate phase pair to drive in order to initiate rotation of the rotor 32. The polarity of the permanent magnet rotor 32 determines the direction of current flow through the phase. Hence, the power stage 16 connects the W-phase 38 to $V_{pwr}$ and the V-phase 40 to ground 24 resulting in current flow into the W-phase 38 and exiting the V-phase 40, as represented with the current arrows. A net effect of current flowing through coils W-phase 38 and V-phase 40 as shown in FIG. 2 is the formation of an electromagnet having a north pole at the W-phase 38 and a south pole at V-phase 40. This electromagnet produces a repulsive force between permanent magnet N-pole 42 and the electromagnet N-pole formed at the W-phase 38 and an attractive force between permanent magnet N-pole 42 and the electromagnet S-pole formed at the V-phase 38.

As N- and S-poles are attracted to each other, if the electromagnet persisted long enough in this current flow configuration, the resulting torque will move the permanent magnet N-pole 42 to a position shortly after the V-phase 40 and the permanent magnet S-pole 34 to a position shortly before the W-phase and rotation of the permanent magnet rotor 32 would stop. To perpetuate rotation of the permanent magnet rotor 32, the power stage 16 must commutate to a new phase pair. The optimum commutation point is a function of the rotor position relative to the coil of the undriven phase (the phase not driven by $V_{pwr}$). In FIG. 2, the U-phase 36 is the undriven phase. Ideally, the rotor angle would span −30° to +30° with respect to alignment with the coil of the undriven phase. As this 60° span is one sixth of one electrical revolution, it is commonly referred to as one sextant.

FIG. 3 is a 6-step commutation process further defined by Table 1, as is known in the prior art. Given the conditions illustrated in FIG. 2, a high level description of the sequence of steps commonly referred to as 6-step commutation process is outlined in Table 1 and further illustrated in FIG. 3.

TABLE 1

Six-step commutation sequence for a wye-connected motor shown in FIG. 2

| Sequence Step | Driven Phase Pair | N-pole position relative to phases | S-pole position relative to phases | Rotor Angle |
|---|---|---|---|---|
| 0 | WV | W + 30° to V − 30° | U − 30° to U + 30° | 1.25-1.75 |
| 1 | WU | V − 30° to V + 30° | U + 30° to W − 30° | 1.75-2.25 |
| 2 | VU | V + 30° to U − 30° | W − 30° to W + 30° | 2.25-2.75 |
| 3 | VW | U − 30° to U + 30° | W + 30° to V − 30° | 2.75-0.25 |
| 4 | UW | U + 30° to W − 30° | V − 30° to V + 30° | 0.25-0.75 |
| 5 | UV | W − 30° to W + 30° | V + 30° to U − 30° | 0.75-1.25 |

The 6-step commutation sequence results in one electrical revolution. Given this simplified example, it is understood that a properly driven permanent magnet rotor will be driven one mechanical revolution when this six-step process is complete. An increase in number of pole pair results in an equivalent increase in the number of electrical revolutions per mechanical revolution. Comparing Table 1 and FIG. 2, it is understood that FIG. 2 illustrates Sequence Step 0 with the permanent magnet N-pole 42 pushed from the W-phase 38 and pulled by the attraction to the V-phase 40. When the permanent magnet S-pole 34 reaches the U+30° position, the power stage 16 commutates to Sequence Step 1 driving current from the W-phase 38 to the U-phase 36 causing the U-phase to become the electromagnetic S-pole. Thus, the U-phase 36 repels or pushes the permanent magnet S-pole 34 and the W-phase 38 attracts the S-pole, continuing the clockwise motion of the permanent magnet rotor 32.

Most current solutions to sensorless control of a brushless permanent magnet motor utilize a symmetric pulse width modulation signal. FIG. 4A is an illustration of one example of one symmetric pulse width modulation signal, as is known in the prior art. One cycle of a symmetric pulse width modulation signal may include a positive voltage V+ for a span of time $T_A$ and then a negative voltage V− for the span of time $T_B$, where the absolute values of V+ and V− are equivalent and a full PWM period is $T_A+T_B$. The span of time spent at V+ is referenced as the energizing portion of the signal and the span of time spent at V− is referenced as the de-energized portion of the signal. FIG. 4B is an illustration of one example of one asymmetric pulse width modulation signal, as is known in the prior art. This signal includes a span of time $T_1$ at V+ and a second span of time $T_2$ at approximately 0V. The sum of $T_1$ and $T_2$ represents the PWM period.

Others have developed solutions to sensorless control of a brushless motor during start-up as they relate to spindle motors for disk drives, compact disk ("CD") drives, and digital video disk/digital versatile disk ("DVD") drives. However, CDs and DVDs do not offer significant or varying resistance to rotor rotation during start-up. Because the initial torque is predictable, performance parameters can be pre-programmed significantly. Other motors, such as those for electric scooters, can have varying resistance applied to the motor. For instance, the torque placed on a motor for an electric scooter may be dependent on the amount of weight on the electric scooter and whether the scooter is facing an incline, a decline, or on a level surface. The motor characteristics are influenced by the magnitude of start-up current needed to overcome the external torque on the motor. The undriven phase is known to carry a voltage influenced by the current on the driven windings and magnetic field from the rotor, among other factors, but has been regarded as too noisy and influenced by too many factors to provide useful information. The undriven phase could be a source of useful data if the noise on the winding could be filtered out.

Thus, a heretofore unaddressed need exists in the industry to address the aforementioned deficiencies and inadequacies.

SUMMARY

Embodiments of the present disclosure provide a system and method for synchronizing sequential phase switching in driving a set of stator windings of a multi-phase sensorless brushless motor. Briefly described, in architecture, one embodiment of the system, among others, can be implemented as follows. The system discloses structure for controlling sequential phase switching in driving a set of stator windings of a multi-phase sensorless brushless permanent magnet DC motor. A motor controller controls a power stage that drives two windings of a set of three windings in the motor with pulse width modulated signal. A plurality of voltage values on an undriven winding of the set of three windings are sampled within a window of time, wherein a period beginning when the driven windings are energized and ending when the driven windings are de-energized encompasses the window of time. The sampled voltage values are processed. When the processed voltage values exceed a threshold, the motor controller changes which two windings are driven.

The present disclosure can also be viewed as providing a method of controlling motor switching. The method includes the steps of: driving a pulse width modulated signal on two windings of a set of three windings; sampling a plurality of voltage values on an undriven winding of the set of three windings within a window of time, wherein a period beginning when the driven windings are energized and ending when the driven windings are de-energized encompasses the window of time; signal processing the sampled voltage values; and changing which two windings are driven when the processed voltage values exceed a threshold.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale. Instead emphasis is being placed upon illustrating clearly the principles of the present disclosure. Moreover, in the drawings, like reference numerals designate corresponding parts throughout the several views.

DETAILED DESCRIPTION

Figure 5:
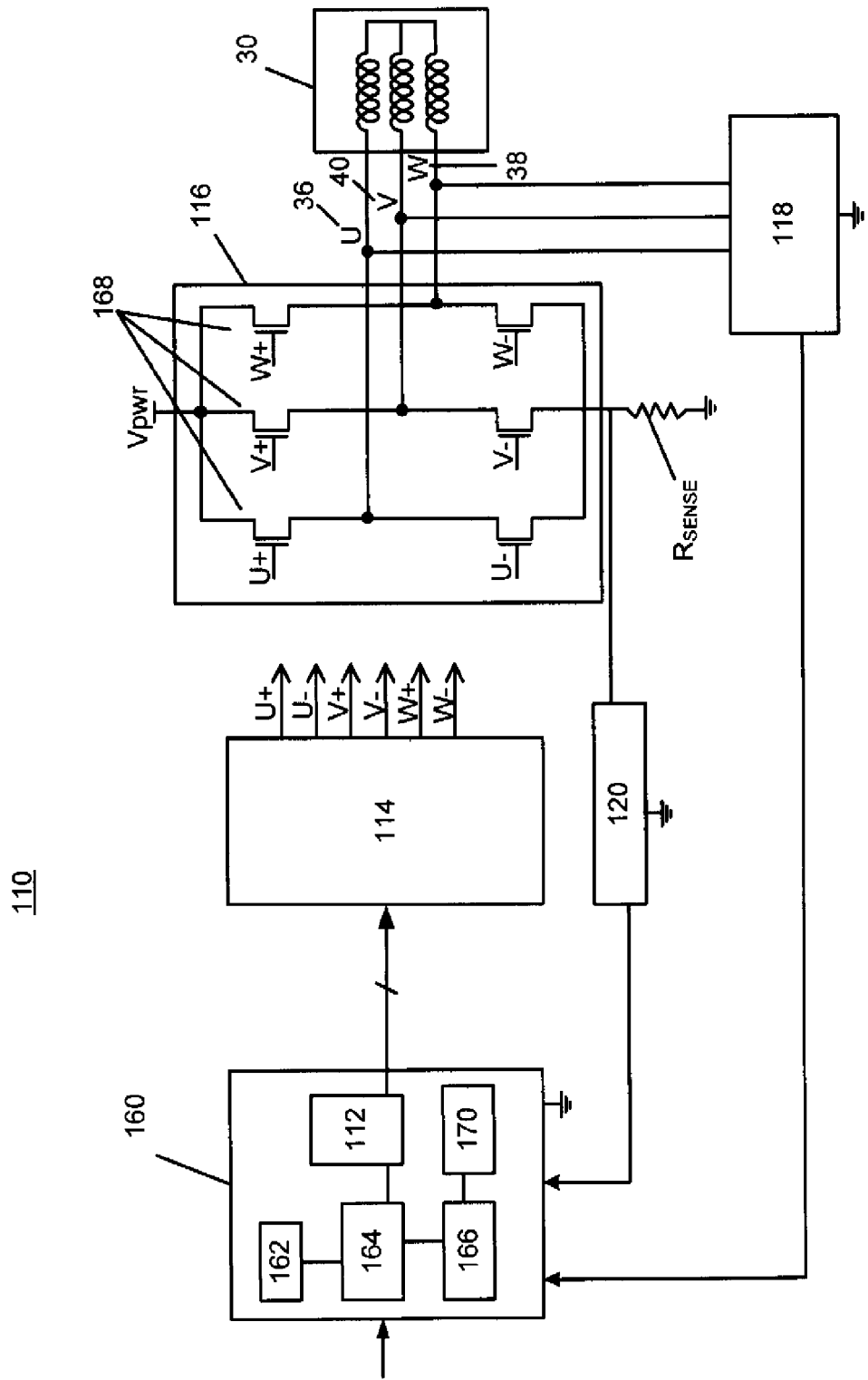
FIG. 5 is a block diagram of a motor control system in a three-phase power stage, in accordance with a first exemplary embodiment of the present disclosure.

FIG. 5 is a block diagram of a motor control system 110 for a three-phase power stage 116 for a sensorless, brushless permanent magnet DC motor 30, in accordance with a first exemplary embodiment of the present disclosure. The motor control system 110 includes a controller unit 160 having a control signal generator 112, a memory device 162, a processing unit 164, a signal acquisition device 166, and an analog-to-digital converter 170. The control signal generator 112 feeds six inputs into a gate driver 114. The gate driver 114, which may be powered by an independent power source (not illustrated), controls six MOSFET switches 168 in the power stage 116. Manipulation of the switches determines current flow from the power source $V_{pwr}$ through the stator windings 36, 38, 40 in the motor 30.

The voltage sense circuit 118 and current sense circuit 120 are used for closed loop control of the motor. The power stage 116 has 6 switches grouped in pairs. Each switch pair is configured as a half bridge. Each switch has a control input. The outputs of power stage 116 are fed into the 3-phase BLDC motor windings U 36, V 40, W 38. The power stage 116 is supplied by a voltage source $V_{pwr}$ having a DC voltage, which the power stage uses to supply a pulse width modulation signal to the windings U 36, V 40, W 38. The current return path for the voltage source $V_{pwr}$ is through ground via current sense resistor $R_{SENSE}$. The power stage 116 for a trapezoidally controlled pulse width modulated brushless DC motor 30 typically energizes two motor windings of the set of three windings 36, 38, 40 at a time.

A voltage signal is available at the undriven phase. This voltage signal can be used to generate a commutation signal by demodulating the undriven phase voltage synchronously with the PWM switching rate. The commutation signal, when a near-zero drive current is present, has a periodicity of ½ electrical revolutions. The shape of this commutation signal is related to the action of the permanent magnet rotor 32 on the stator windings 36, 38, 40. Demodulation can be performed by simply taking the difference in voltage between the undriven phase and the switching in two different driven states of the PWM when the PWM signal is symmetric. Demodulation can be performed by simply taking the difference in voltage between the undriven phase and a reference voltage during the energizing portion of the PWM when the PWM signal is asymmetric. When a materially-greater-than-zero current is driven into the active pair of terminals, the signal has an added component with a periodicity of a full electrical cycle.

Figure 1:
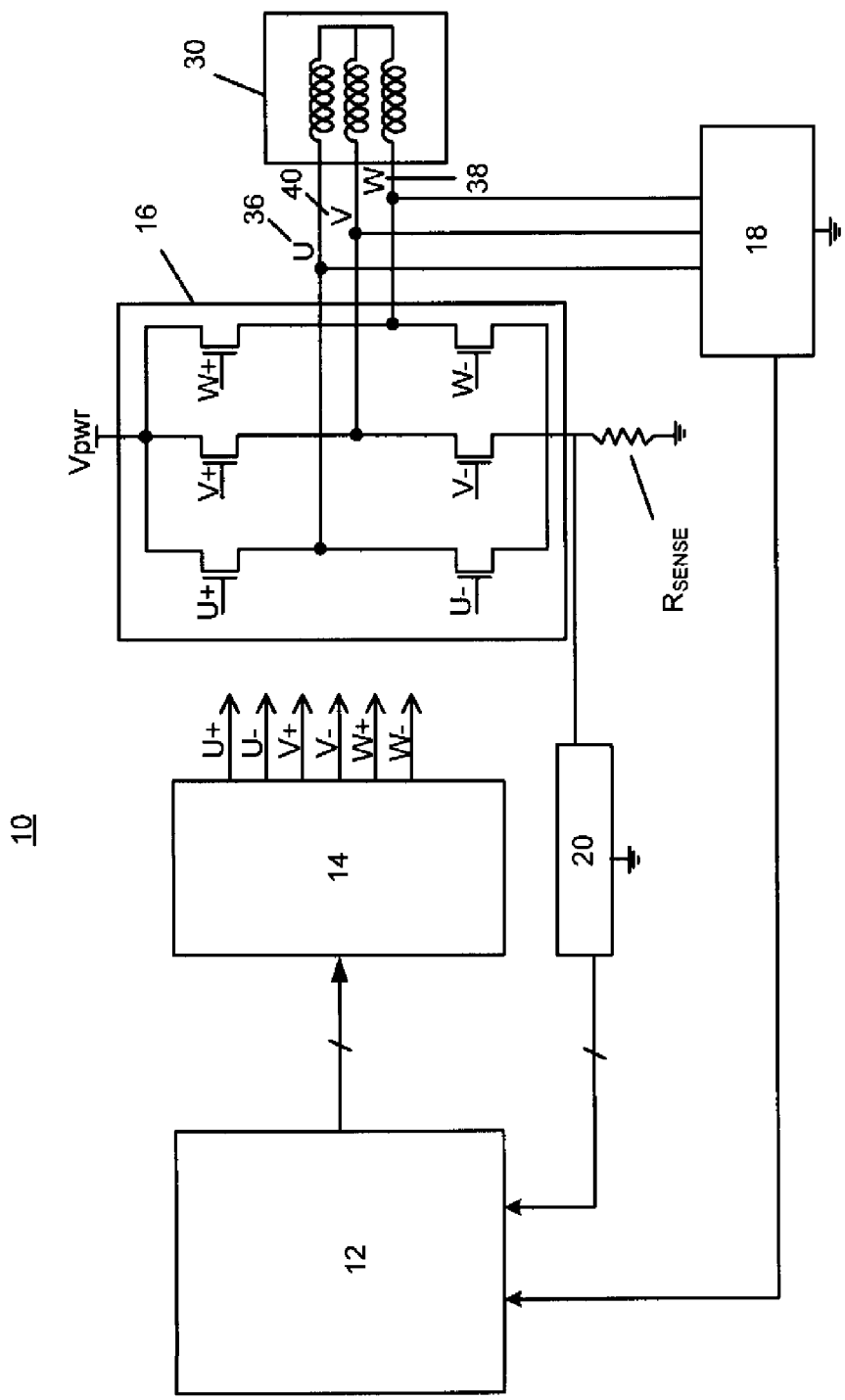
FIG. 1 is a block diagram of a motor control system in a three-phase power stage, as is known in the prior art.
Figure 2:
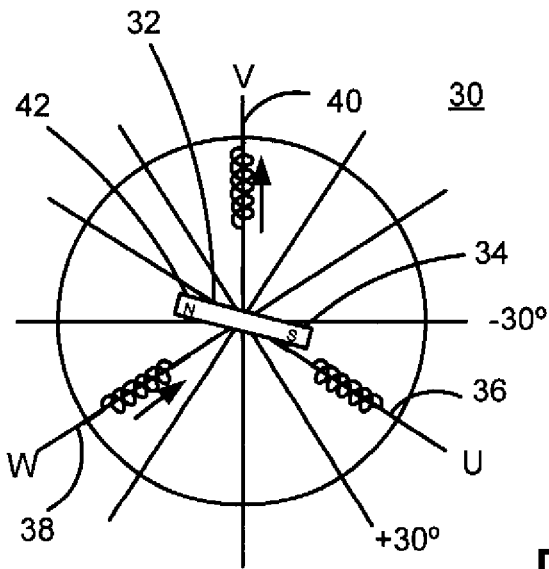
FIG. 2 is an illustration of a wye-connected motor, as is known in the prior art.
Figure 3:
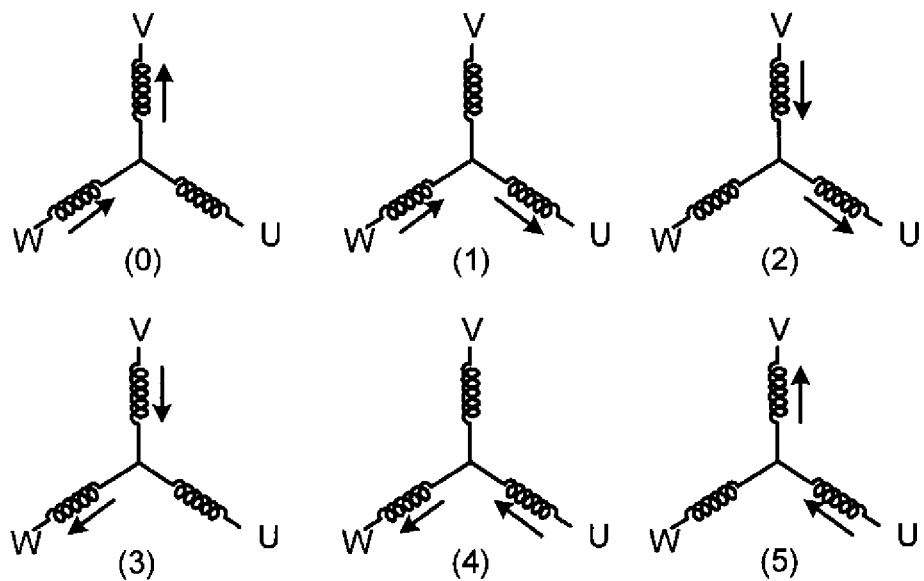
FIG. 3 is a 6-step commutation process further defined by Table 1, as is known in the prior art.
Figure 6:
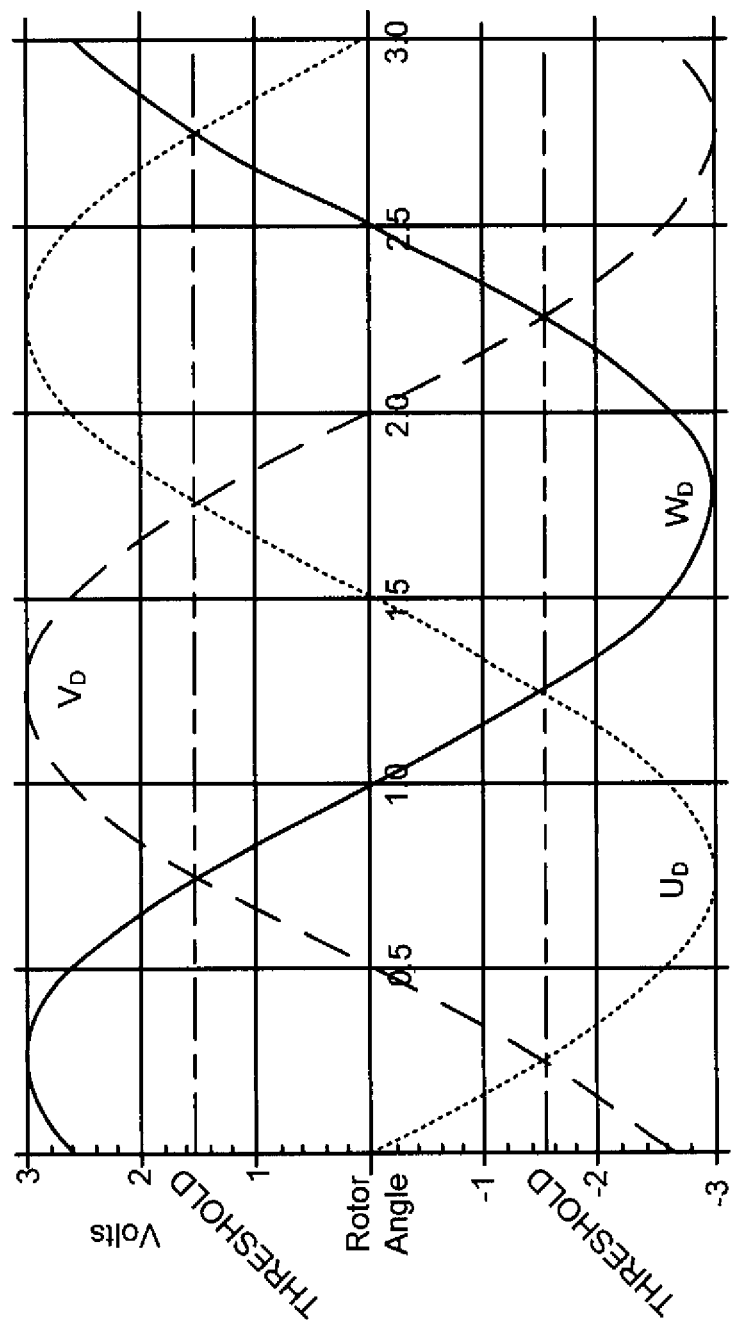
FIG. 6 is an illustration of demodulated signals representing motor phases illustrated in FIG. 2.

FIG. 6 is an illustration of demodulated undriven phase signals representing motor phases illustrated in FIG. 2 and FIG. 3. The subscript D indicates the signal is from a demodulated undriven winding. Here, the undriven phase signals are illustrated for a ½ electrical cycle superimposed upon each other relative to rotor angle. The proper commutation time can be determined by monitoring the undriven phase signal, derived from the demodulated undriven phase signal, and commutating at a value that is a function of the motor current. As the current increases, a comparison value will change, but FIG. 6 is representative of a near-zero current through the driven windings.

As illustrated in FIG. 6, the dotted line $U_D$ represents the demodulated signal produced when the U-phase 36 is disconnected during commutation sequence step 0, and the WV phases 38, 40 are driven with a PWM wave. This drive combination is the connection that generates the most torque from the rotation position 1.25 to the 1.75 point on the x-axis, which is the sextant position If the motor is being driven with torque pushing to the right, when 1.75 point is reached, the motor is rotating in the proper direction, and commutation from WV phases to WU phases should occur at the 1.75 point. Likewise, if the rotor is rotating counterclockwise while being electrically driven clockwise, such as starting an electric scooter on a hill, $U_D$ has negative slope between 1.25 and 1.75. If the 1.25 point is reached, the prior commutation phase UV or commutation sequence step 5 should be switched in. These points are associated with the demodulated signal $U_D$, reaching approximately 1.5 or −1.5 volts for forward or reverse commutation respectively, illustrated as THRESHOLD in FIG. 6. When 1.75 on the x-axis is reached, upon commutating to WU phases, the demodulated signal associated with the V-phase 40, i.e. $V_D$, will then be generated. If 1.25 is reached (forced in reverse), the demodulated signal associated with the W phase, i.e. $W_D$, will then be generated.

If the commutation signal component from the permanent magnets is dominant, determining the time for commutation is straightforward. The commutation signal from the undriven phase is derived, and when pre-determined values are reached, the motor is advanced to the next or prior phase. The prior phase advance is important, as the load may be rotating in the direction opposite to the desired rotation upon start. For maximum torque, it is important that the commutation levels be relatively accurate.

When the required starting torque is high, a materially-greater-than-zero current is needed through the driven windings to generate the high torque. The commutation breakpoint is harder to determine from the undriven phase signal when the driven winding current is high. The commutation signal transforms substantively with respect to rotational position when the current has surpassed a near-zero level.

Figure 7:
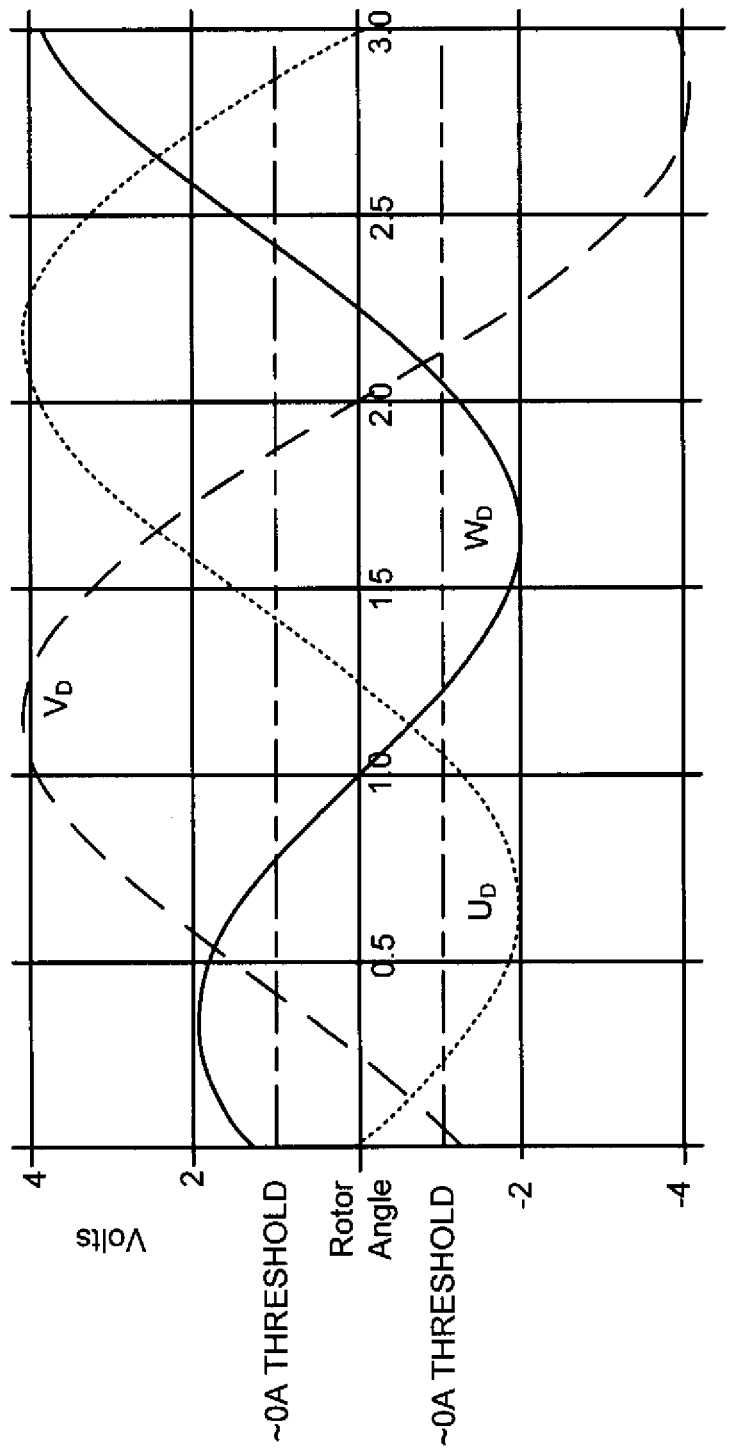
FIG. 7 is an illustration of demodulated signals representing motor phases illustrated in FIG. 2 under the influence of high torque and current.

FIG. 7 is an illustration of demodulated signals representing motor phases illustrated in FIG. 2 under the influence of high torque and current. The proper values for the demodulated undriven winding ($U_D$) signal at the previously identified commutation breakpoints (when the rotor angle is 1.25 and 1.75) are 0V and 3V. Thus, if the motor controller operated with a threshold of −1.5V and 1.5V for commutation, as was shown in FIG. 6, the motor would not be able to obtain the maximum available torque that is acquired with proper motor commutation. In the forward motion case, the commutation will be too early, causing a transfer to a commutation sequence step that will provide less torque. In the case the motor is rolling backward, the commutation may be too late to achieve high torque from the previous commutation step. Further, at slightly higher currents, the result may be failure to commutate altogether leading the controller to errantly attempt to drive the motor in the wrong direction. The effect of current on the demodulated signal may be different for even and odd sextants (commutation sequence steps 0, 2, and 4 as opposed to 1, 3, and 5). Motor characteristics indicate the portion of the demodulated signal associated with even sextants varies proportionally with current and the portion of demodulated signal associated with odd sextants varies inversely with current.

Figure 8:
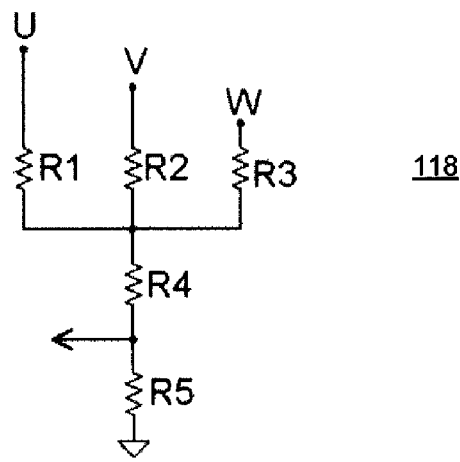
FIG. 8 is an illustration of an exemplary voltage sense circuit that may be used in conjunction with the motor control system in FIG. 5, in accordance with the first exemplary embodiment of the present disclosure.

FIG. 8 is an exemplary voltage sense circuit 118 that may be used in conjunction with the motor control system 110 in FIG. 5, in accordance with the exemplary embodiment of the present disclosure. The voltage sense circuit 118 is placed in the feedback path of a first control loop, between the power stage outputs 116 and the controller unit signal acquisition device 166. The voltage sense circuit 118 includes a resistor network comprising resistors R1, R2, R3, R4, and R5 coupled together as shown in FIG. 8. Voltage sense circuit 118 has three inputs connected to three motor terminals, U 36, V 40, W 38. The voltage sense circuit 118 superposes motor voltage response from each phase 36, 38, 40 and divides the result to level in accordance with input requirements from signal acquisition 166. The result includes the voltage on the undriven phase. While similar motor control configurations include voltage sense circuits 118, these circuits are directed to retrieving a back EMF signal and regularly filtering out the undriven phase voltage to get a cleaner back EMF signal.

Figure 9:
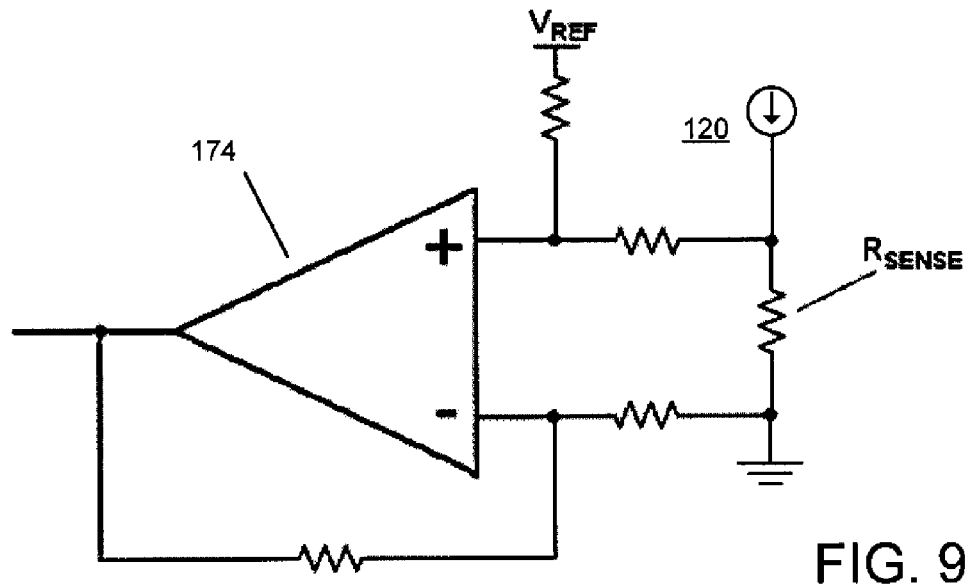
FIG. 9 is an illustration of an exemplary current sense circuit that may be used in conjunction with the motor control system in FIG. 5, in accordance with the first exemplary embodiment of the present disclosure.

FIG. 9 is an exemplary current sense circuit 120 that may be used in conjunction with the motor control system 110 in FIG. 5, in accordance with the exemplary embodiment of the present disclosure. The current sense circuit 120 is placed in the feedback path of a second control loop, between a current sense resistor $R_{SENSE}$ and the controller unit signal acquisition device 166. The power supply voltage levels of current sense circuit 120 and controller unit 160 are approximately the same. Current sense circuit 120 includes an amplifier 174 configured for differential measurement of voltage across $R_{SENSE}$, as shown in FIG. 5. The amplifier 174 input common-mode voltage and gain are set such that amplifier output is at approximately mid-supply to facilitate monitoring of $R_{SENSE}$ current flowing in positive and negative direction.

Figure 10A:
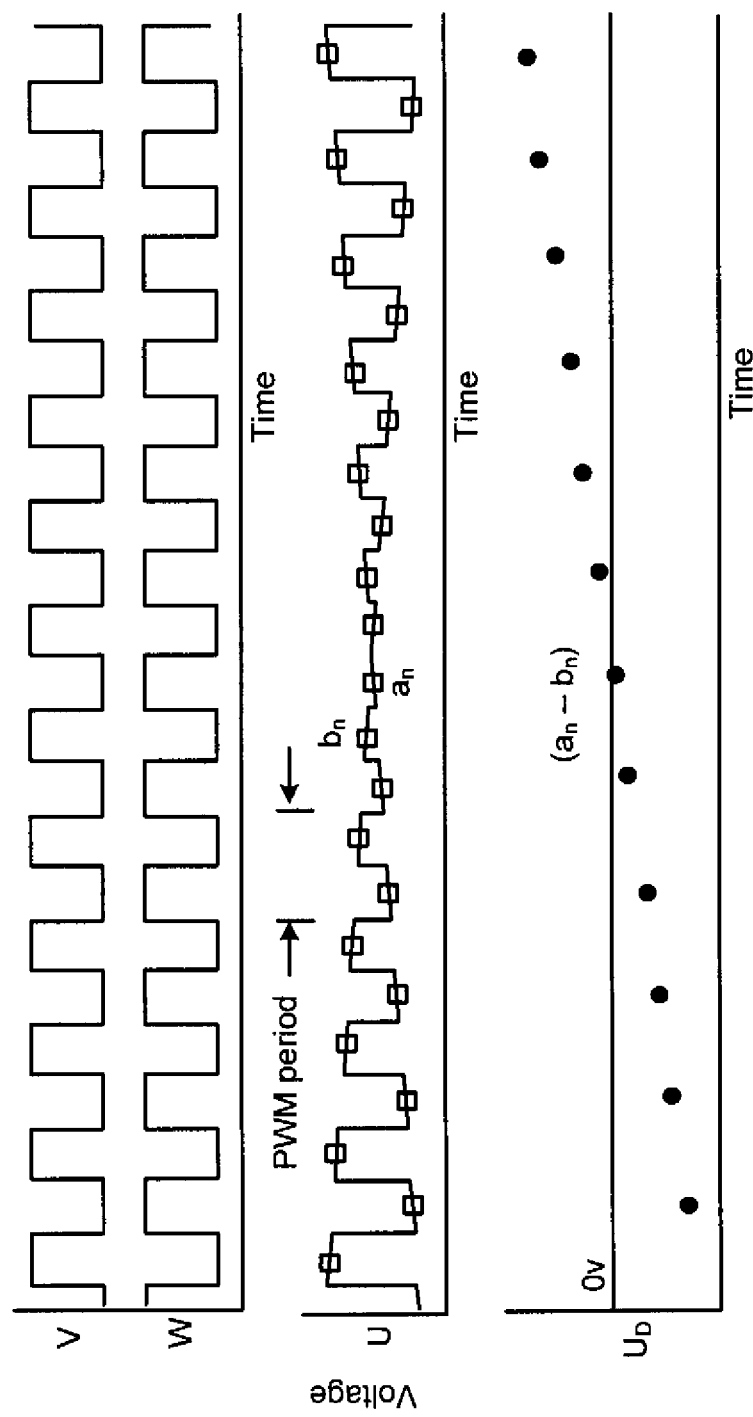
FIG. 10A is an illustration of the demodulated undriven phase signal associated with the motor control system of FIG. 5 driven with a symmetrical pulse width modulation signal, in accordance with the first exemplary embodiment of the present disclosure.

The motor control system 110 may be used to control a motor 30, such as the motor 30 illustrated in FIG. 2. FIG. 10A is an illustration of the demodulated undriven phase signal associated with the motor control system 110 driven with a symmetrical pulse width modulation signal, in accordance with the exemplary embodiment of the present disclosure. Signals V and W are driven signals on two terminals of the motor 30. FIG. 10A illustrates a 50% duty cycle PWM with complementary drive. The drive phase voltage will normally be a value between ground and the power supply voltage $V_{pwr}$. Typical switching frequencies are in the range of 1 kHz to 25 Khz, depending on motor size and construction as well as other factors. The signal at the undriven phase is shown in FIG. 10 as signal U. Signal U changes as a function of rotor position which varies the magnetic fields in the stator. The demodulated undriven phase signal $U_D$, which is used for position sensing, is derived by measuring the voltage difference on signal U between the high $b_n$ and low $a_n$ level. This voltage difference can be viewed as demodulation of the position signal from the PWM signal. The demodulated signal is compared with an established threshold, such as the threshold shown in FIG. 5, and used to determine the commutation breakpoint where the power stage output will switch to a next winding pair to drive. The illustration of $U_D$ in FIG. 10 is analogous to the 1.25-1.75 rotor angle portion of the $U_D$ curve in FIG. 5 operating with steady rotor movement.

Figure 10B:
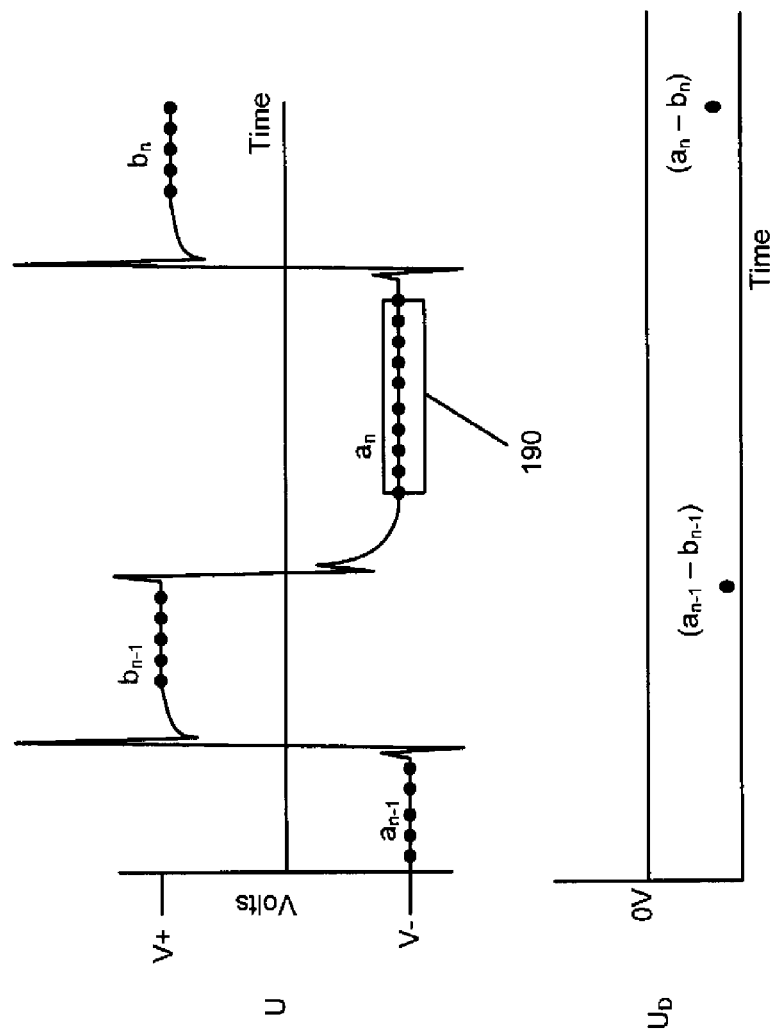
FIG. 10B is an illustration of less than two periods of the undriven phase signal associated with the motor control system of FIG. 5 driven with a symmetrical pulse width modulation signal, in accordance with the exemplary embodiment of the present disclosure.

FIG. 10B is an illustration of less than two periods of the demodulated undriven phase signal associated with the motor control system 110 driven with a symmetrical pulse width modulation signal, in accordance with the exemplary embodiment of the present disclosure. The U and $U_D$ curves in FIG. 10B are comparable to those curves in FIG. 10A. As is evident in FIG. 10B, the U curve is more volatile in the moment the motor switches between an energized portion of the PWM signal and a de-energized portion of the PWM signal and then stabilizes. The voltage on the undriven phase U while the motor is changing between energized and de-energized portions of the PWM period is not as useful for defining the rotor position or commutation points as it is when the U signal has stabilized. As is shown in FIG. 10B, a number of samples $a_n$ may be taken during the energized portion and a number of samples $b_n$ may be taken during the de-energized portion. These samples may be averaged or otherwise filtered to arrive at an overall value for each portion. The difference of the filtered $a_n$ and filtered $b_n$ provides a single demodulated voltage value for that PWM period as shown in FIG. 10B.

Figure 11A:
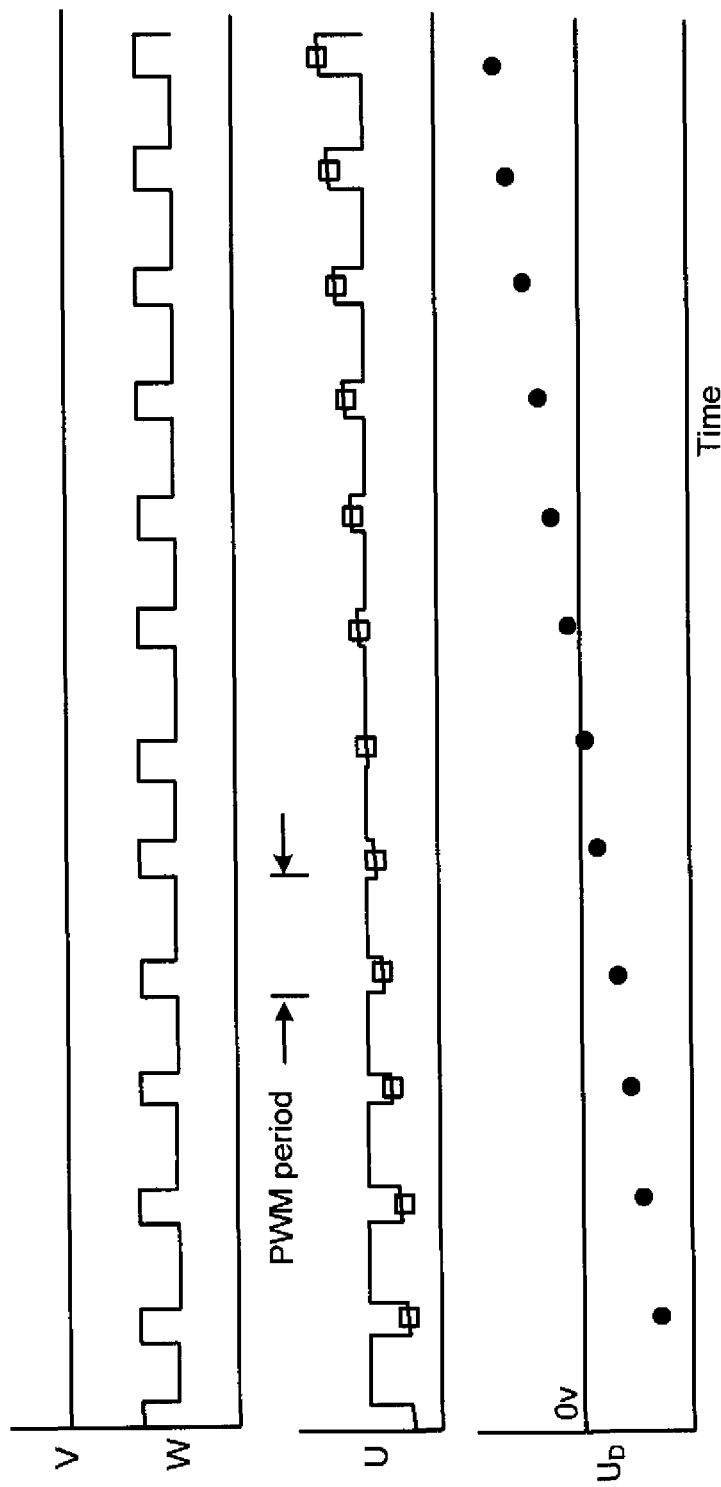
FIG. 11A is an illustration of the demodulated undriven phase signal associated with the motor control system when driven of FIG. 5 with an asymmetric PWM signal, in accordance with the first exemplary embodiment of the present disclosure.

FIG. 11A is an illustration of the demodulated undriven phase signal associated with the motor control system 110 when driven with an asymmetric PWM signal, in accordance with the first exemplary embodiment of the present disclosure. Signals V and W are driven signals on two terminals of the motor 30. When the motor is operating in step 0 of the commutation sequence as shown in FIG. 3, the W+ gate and the V− gate will close when energizing while the other four gates are open. While de-energizing, the W− gate and the V− gate will close, disconnecting the set of windings from $V_{pwr}$ and connecting the W and V phases to each other and ground. The drive phase voltage will normally be a value between ground and the power supply voltage. Typical switching frequencies are in the range of 1 KHz to 25 KHz, depending on motor size and construction as well as other factors. The signal at the undriven phase is shown in FIG. 11A as signal U. Signal U changes as a function of rotor position which varies the magnetic fields in the stator. The demodulated undriven phase signal, $U_D$, which is used for position sensing, is derived by measuring the voltage during the energizing phase with respect to a reference voltage. This comparison of the measured voltage with a reference voltage is at least part of the demodulation step. This demodulated signal is compared with an established threshold, such as the threshold shown in FIG. 6, and used to determine the commutation breakpoint where the power stage output will switch to a next winding pair to drive. The illustration of $U_D$ in FIG. 11 is analogous to the 1.25-1.75 rotor angle portion of the $U_D$ curve in FIG. 6 with a rotor rotating at a constant speed.

Figure 11B:
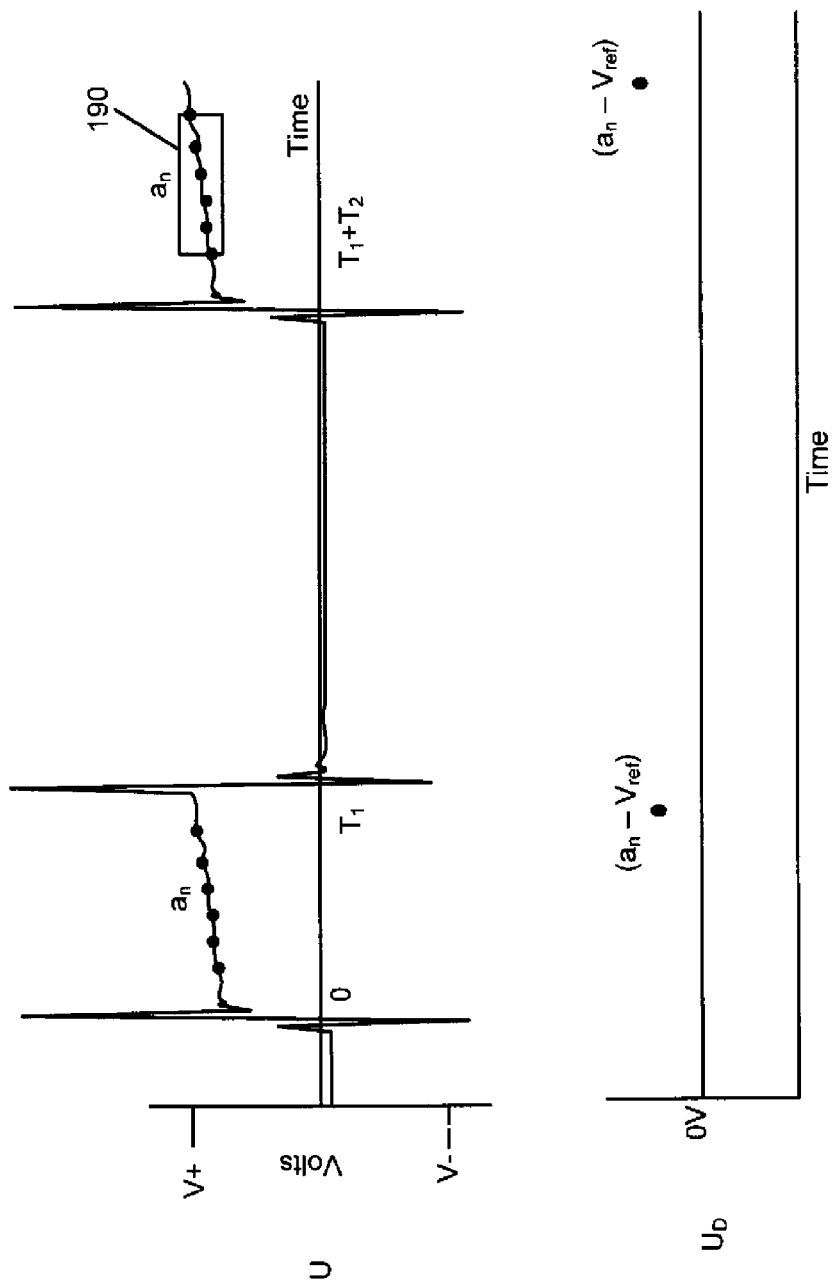
FIG. 11B is an illustration of less than two periods of the demodulated undriven phase signal associated with the motor control system driven of FIG. 5 with an asymmetrical pulse width modulation signal, in accordance with the exemplary embodiment of the present disclosure.

FIG. 11B is an illustration of less than two periods of the demodulated undriven phase signal associated with the motor control system 110 driven with an asymmetrical pulse width modulation signal, in accordance with the exemplary embodiment of the present disclosure. The U and $U_D$ curves in FIG. 11B are comparable to those curves in FIG. 11A. As is evident in FIG. 11B, the U curve is more volatile in the moment the motor switches between an energized portion of the PWM signal and a de-energized portion of the PWM signal and then stabilizes. The voltage on the undriven phase U while the motor is changing between energized and de-energized portions of the PWM period is not as useful for defining the rotor position or commutation points as it is when the U signal has stabilized. As is shown in FIG. 10B, a number of samples $a_n$ may be taken during the energized portion. Samples may be taken during the de-energized phase but are not required for practice of the disclosed invention. These samples may be averaged or otherwise filtered to arrive at an overall value for each portion. The difference of the filtered a, and a reference voltage provides a single demodulated voltage value for that PWM period as shown in FIG. 11B.

Figure 12:
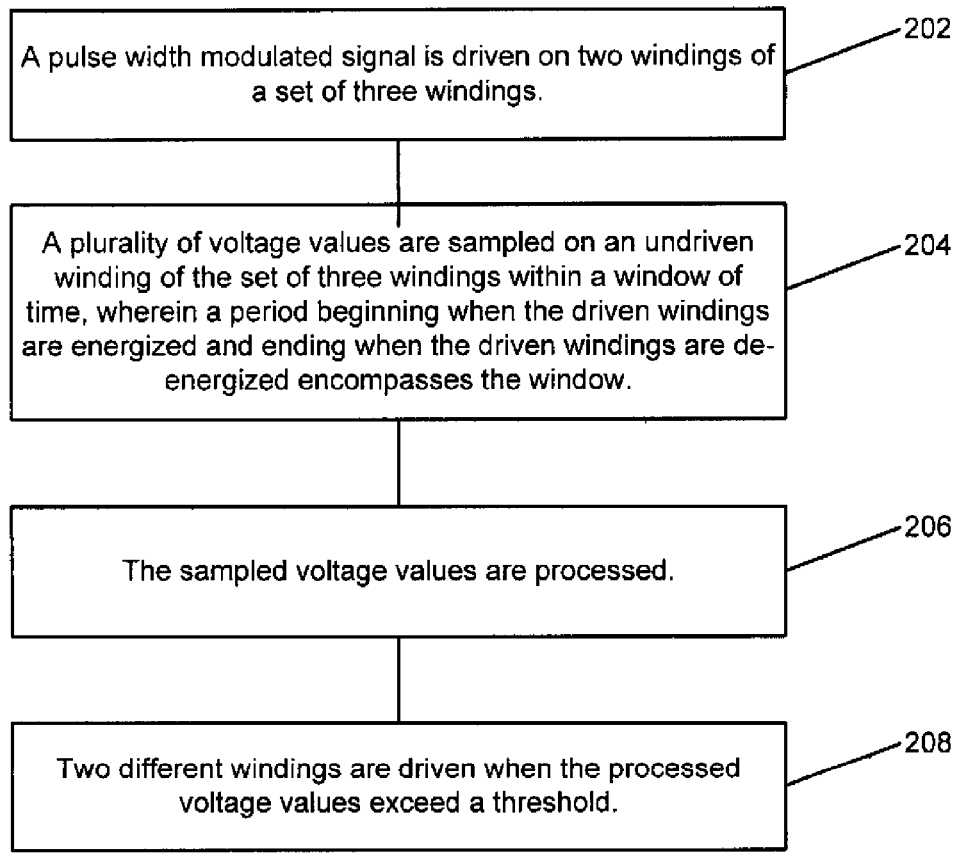
FIG. 12 is an illustration of a flowchart illustrating a method of using the motor control system 110 of FIG. 5, in accordance with the first exemplary embodiment of the present disclosure.

FIG. 12 is an illustration of a flowchart illustrating a method of using the motor control system 110 of FIG. 5, in accordance with the exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a pulse width modulated signal is driven on two windings of a set of three windings. A plurality of voltage values are sampled on an undriven winding of the set of three windings within a window of time, wherein a period beginning when the driven windings are energized and ending when the driven windings are de-energized encompasses the window (block 204). The sampled voltage values are processed (block 206). Two different windings are driven when the processed voltage values exceed a threshold (block 208).

The step of changing which two windings are driven may involve changing which phases are driven after the demodulated measured voltage has exceeded the threshold for a set period of time. The undriven voltage signal may experience noise, and that noise may cause the threshold to be surpassed prematurely and temporarily. Verifying that the demodulated measured voltage continues to exceed the threshold for a period of time diminishes the possibility that the threshold is surpassed as a result of noise instead of properly identified rotor position.

The threshold may be set as a function of the pulse width modulated signal. For instance, as an amplitude of the pulse width modulation signal increases, the absolute value of the thresholds should increase to properly compensate for the undriven winding voltage also increasing in value. The threshold may be predetermined and modified as a function of a characteristic of the pulse width modulated signal. Similarly, the demodulated measured voltage value may be modified within the motor controller as a function of the pulse width modulated signal to allow the demodulated measured voltage value to intersect the threshold at the proper rotor rotation angles.

The demodulated measured voltage may be modified by scaling the demodulated measured voltage.

The signal processing step may be performed by a signal processing circuit containing at least one delta-sigma analog to digital converter 170. The delta-sigma analog to digital converter may have a sample rate of at least sixteen (16) times the PWM frequency. The signal processing step may further include at least two analog to digital converters. An analog summing network may obtain the processed voltage values further calculated by measuring a difference between the undriven winding and an average of the two driven windings for an analog to digital converter input.

As is illustrated in FIG. 10B and FIG. 11B, some of the data in the undriven voltage signal is more desirable than other data. Thus, data collection may be a sampling of undriven voltage values at discrete times relative to the switching between energized and de-energized states of the motor. The time from which sampling begins until it concludes during one energized or de-energized portion is termed a "window" herein. An exemplary window 190 is illustrated in FIGS. 10B and 11B. The first sample taken and utilized in a calculation of a demodulated undriven voltage symbolizes the opening of the window and the last sample within the window symbolizes the closing of the window. A set of switches in a power stage command the pulse width modulated signal on the driven windings. The window may open at the moment when two switches in the power stage close, and the window may close at the moment when at least five of the switches in the power stage are open. At those switching moments, it can be seen from the illustrations that the undriven voltage ripples. The system may be designed to manipulate the window to collect undriven voltage data that is less impacted by the ripples, thereby isolating a portion of the voltage on the undriven winding more directly attributable to rotor position.

In one variant embodiment, the window may open a delayed time frame after two switches in the power stage close, and the window may close at the moment when at least five of the switches in the power stage are open. The delayed time frame may be until the processor determines an undriven voltage value exceeding 50% of the voltage supply $V_{pwr}$. For negative voltages, only the magnitude of the voltage may be considered to determine if 50% of the voltage supply $V_{pwr}$ is exceeded.

More complex methods may be used to define the delayed time frame. The processor may calculate a deviation of the plurality of voltage values sampled, and the window spans a set of consecutive sampled voltage values that vary less than a threshold percentage from a mean of the voltage values, represented by:

$$|X_i - X_{ave}|/X_{ave} < K.$$

where K is a threshold deviation constant, $X_{ave}$ is mean of the demodulated voltage values over the window and $X_i$ is each demodulated sample voltage values in the window series.

The processor may sample the undriven voltage across the duration of an energized or de-energized portion and then define the window after the motor proceeds to the next portion. The sampled undriven voltage that was not within the window may be discarded by the processor when calculating the demodulated voltage. The processor may determine the window is closed when the motor proceeds to the next portion and then define the opening of the window as a determined time frame before the window closed. For example, once the window may be termed open 0.5 msec before the window closed or it may be opened such that the window spans 50% of the energized/de-energized portion. The determined time frame may be a function of duty cycle of the pulse width modulation signal.

The values within the windows 190 can be processed in a number of different ways to achieve a value representative of the undriven voltage during the relative energized/de-energized portion. As mentioned, the sampled voltage values within the window may be averaged. The sampled voltage values may each be multiplied by a weighting function and summed. The weighting function may be a time-varying periodic function synchronous with the PWM signal. Each of the sampled voltage values may be multiplied by a weighting function, and a subset of the previous filter outputs may be multiplied by a weighting function and the products summed together, a process associated with infinite impulse response filters to those having ordinary skill in the art. The step of signal processing may be initiated prior to the step of sampling.

When the pulse width modulated signal has a 50% duty cycle, the plurality of voltages may be multiplied by a filter with a sine wave and a cosine wave weighting function. The sine wave and cosine wave filter is multiplied by the plurality of sampled voltage values and summed, and the window is defined by a period in which the sine wave filter sum is approximately zero.

FIRST EXEMPLARY COMMUTATION BREAKPOINT CALCULATION

A pulse width modulation signal is provided to two windings at a level that provides a near zero average current ($I_{min}$) over the two windings. A first set of voltage data representing the motor voltage response signal on the undriven phase 36, spanning at least an entire sextant, is obtained. A first set of current data representing the driven phase current is collected corresponding to each data point in the first set of undriven voltage data. The process is repeated with a pulse width modulation signal that provides a mid-level drive phase current (a.k.a. $I_{mid}$) and again with a pulse width modulation signal that provides an approximately maximum drive phase current (a.k.a. $I_{max}$).

A first set of coefficients representing the influence of mid-level values of current is calculated based on first and second current data sets.

$$COeff_{midCurrent} = (V_{MTR}(I_{mid}) - V_{MTR}(I_{min}))/(I_{mid} - I_{min})$$

Where $V_{MTR}$ is the demodulated motor voltage response signal based on the undriven phase 36.

A second set of coefficients representing the influence of max-level values of current is calculated based on first and third current data sets $$Coeff_{maxCurrent} = (V_{MTR}(I_{max}) - V_{MTR}(I_{min}))/(I_{max} - I_{min})$$

The effect of current on the commutation signal is different in odd sextants compared to even sextants. Therefore, said first and second sets of coefficients are created for both even and odd sextants.

$Coeff_{midCurrent}$ (odd)
$Coeff_{midCurrent}$ (even)
$Coeff_{maxCurrent}$ (odd)
$Coeff_{maxCurrent}$ (even)

The resultant coefficient values can be used as-is under specific conditions. For example, if an application runs at specific currents because the motor drives known loads, then the coefficients can be stored in a lookup table. At each operating current level, the coefficients can then be read from the table and used to compensate the undriven phase signal for that current.

Another method of modifying the threshold and/or demodulated voltage includes transforming the resultant coefficient values into Slope and Intercept values for even and odd sextants, which can then be generally applied for a wide set of current values. The Slope and Intercept values are stored in memory.

The coefficient as a function of current is calculated as:

$$Coefficient(I) = slope * I_{avg} + intercept$$

Figure 4A:
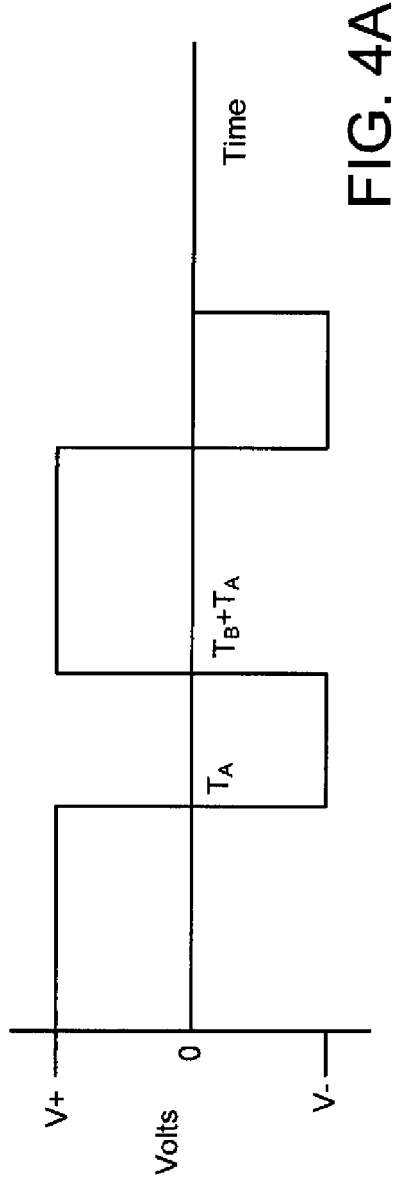
FIG. 4A is an illustration of one example of one symmetric pulse width modulation signal, as is known in the prior art.
Figure 4B:
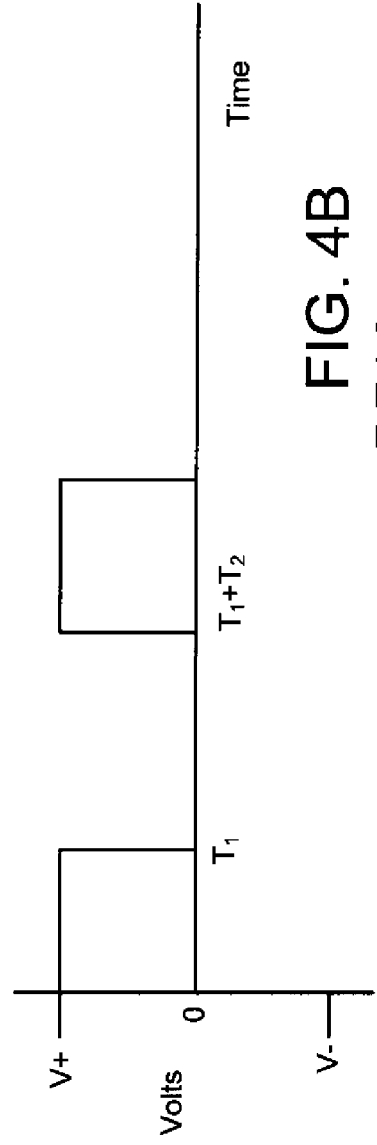
FIG. 4B is an illustration of one example of one asymmetric pulse width modulation signal, as is known in the prior art.

In this equation, $I_{avg}$ is the average driven phase current, obtained in this example via amplifier 174 in difference configuration monitoring low side shunt resistor and generally described as current sense block in FIG. 4 and FIG. 9. The amplifier output is sampled and digitized in both the on and off portions of the PWM cycle. The values are digitally processed to produce the average motor phase current in the PWM cycle. The Slope and Intercept values may be obtained from memory device 162. Sextant parity determines whether Slope and Intercept data for odd or even sextants is used.

Slope is effectively calculated as $\Delta V/\Delta I$, hence, Coefficient (I) has units of resistance.

A correction factor as a function of current is then calculated as:

$$V_{CF}(I) = I_{avg} * Coefficient(I)$$

Controller unit memory device 162 contains constant values representing motor characteristics. Constant value(s) for commutation breakpoint is stored in memory device 162. Slope and intercept values are stored in memory device 162.

Processing unit 164 performs arithmetic calculations based on stored and measured data. Specifically, the correction factor, $V_{CF}(I)$, is calculated and the motor voltage response on the undriven phase is demodulated. The processing unit 164 inverts the polarity of the demodulated signal in every other sextant such that the slope of the demodulated signal with respect to the direction of the applied torque is positively independent of the sextant. The processing unit 164 modifies the demodulated signal with the correction factor in accordance with the winding current. The processing unit 164 calculates direction of the demodulated signal based on its slope between commutation breakpoints, thereby confirming direction of rotation. A difference between first and second demodulated signal data points taken between consecutive commutation breakpoints is compared to a threshold value. A difference value greater than the threshold value indicates positive slope, while a difference value less than the threshold value indicates negative slope. The definition of slope by way of comparison to a threshold value is arbitrary. For example, a difference value less than a threshold value could just as well define a positive slope.

The processing unit 164 compares a modified/corrected demodulated signal to a stored forward commutation breakpoint. At least one occurrence of the combination of a modified demodulated signal having value greater than the forward commutation breakpoint value and confirmed forward direction of rotation results in processing unit 164 controlling the control signal 112 to commutate the power stage 116 to a next phase pair. Requiring multiple occurrences of the satisfying condition prior to commutating may increase system robustness. The processing unit 164 compares a modified/corrected demodulated signal to a stored reverse commutation breakpoint. At least one occurrence of the combination of a modified demodulated signal having value less than the reverse commutation breakpoint value and confirmed reverse direction of rotation results in processing unit 164 controlling PWM 112 to commutate the power stage 116 to a previous phase pair. Requiring multiple occurrences of the satisfying condition prior to commutating may increase system robustness.

An average current across the driven windings can be acquired a number of ways, including measurement and modeling, some of which are known to those skilled in the art. One useful method for obtaining the current across the driven windings is averaging a current measured by an analog to digital convertor and a current sense mechanism. As is discussed above, the average current is used to modify at least one of the thresholds and the demodulated measured voltage.

When the rotor rotates fast enough, relative to other motor characteristics and operating conditions, a reliable back EMF signal becomes available. Use of a reliable back EMF signal to control commutation from driven pair to driven pair is well known in the art. Thus, the techniques disclosed herein are designed for controlling commutation when the rotor is not moving or is rotating at speeds below which a reliable back EMF signal is available. The motor control switches to the back EMF commutation technique when a rotational speed of the rotor surpasses a speed threshold such that the reliable back EMF signal is available.

It should be emphasized that the above-described embodiments of the present disclosure, particularly, any "preferred" embodiments, are merely possible examples of implementations, merely set forth for a clear understanding of the principles of the disclosed system and method. Many variations and modifications may be made to the above-described embodiments of the disclosure without departing substantially from the spirit and principles of the disclosure. All such modifications and variations are intended to be included herein within the scope of this disclosure and protected by the following claims.

What is claimed is:

1. Method of controlling motor switching, the method comprising:
   manipulating a gate controller with a control unit to drive a pulse width modulated signal on two windings of a set of three windings within a motor;
   sampling a plurality of voltage values on an undriven winding of the set of three windings within the motor within a window of time with a voltage sense circuit, wherein a period beginning when the driven windings are energized and ending when the driven windings are de-energized encompasses the window of time;
   signal processing the sampled voltage values from the voltage sense circuit, wherein the signal processing is completed within the controller unit; and
   changing which two windings are driven when the processed voltage values exceed a threshold with the controller unit manipulating the gate controller.

2. The method of claim 1, wherein a set of switches in a power stage control the pulse width modulated signal on the driven windings, wherein the window of time begins when two switches in the power stage close and the window of time ends when at least five of the switches in the power stage are open.

3. The method of claim 1, wherein a set of switches in a power stage control the pulse width modulated signal on the driven windings, wherein the window of time begins a delayed time frame after two switches in the power stage close and the window of time ends when at least five of the switches in the power stage are open.

4. The method of claim 3, further comprising identifying a first voltage value exceeding 50% of the pulse width modulated supply and the window of time begins when the first voltage value is sampled.

5. The method of claim 3, further comprising determining a deviation of the plurality of voltage values and having the window of time span the consecutive sampled voltage values that vary less than a threshold percentage from a mean of the voltage values, thereby isolating a portion of the voltage on the undriven winding more directly attributable to rotor position.

6. The method of claim 1, wherein a set of switches in a power stage control the pulse width modulated signal on the driven windings, wherein the window of time ends when at least five of the switches in the power stage are open and the window of time is then defined as beginning a determined time frame before the window of time ends.

7. The method of claim 6, wherein the time frame is determined as a function of the duty cycle.

8. A method of controlling motor switching, the method comprising:
   manipulating a gate controller with a control unit to drive a pulse width modulated signal on two windings of a set of three windings within a motor;
   sampling a first plurality of voltage values on an undriven winding of the set of three windings within the motor within a first window of time with a voltage sense circuit, wherein a period beginning when the driven windings are energized and ending when the driven windings are de-energized encompasses the first window of time;
   sampling a second plurality of voltage values on the undriven winding of the set of three windings within the motor within a second window of time with the voltage sense circuit, wherein a period beginning when the driven windings are de-energized and ending when the driven windings are energized encompasses the second window of time;
   signal processing the first sampled voltage values and the second voltage values from the voltage sense circuit, wherein the signal processing is completed within the controller unit; and
   changing which two windings are driven each time the processed voltage values surpass a threshold with the controller unit manipulating the gate controller.

9. The method of claim 8, wherein the first plurality of voltage values are processed into a first filtered voltage value and the second plurality of voltage values are processed into a second filtered voltage value and the processed voltage value is a difference of the first filtered voltage value and the second filtered voltage value.

10. The method of claim 8, wherein the signal processing the sampled voltages further comprises multiplying each of the sampled voltages by a weighting function and summing the products.

11. The method of claim 10, wherein the weighting function is a time-varying periodic function synchronous with the PWM signal.

12. The method of claim 8, wherein the signal processing the sampled voltages further comprises multiplying each of the sampled voltages by a weighting function and multiplying a subset of the previous signal processing output values by a function and summing the products.

13. The method of claim 8, wherein the signal processing is initiated prior to the step of sampling.

14. The method of claim 8, wherein the pulse width modulated signal has a 50% duty cycle and the plurality of voltages are filtered with a sine wave and a cosine wave, wherein the sine wave filter is multiplied by the plurality of voltages and summed, and wherein the window defines a period in which the sine wave filter sum is zero.

15. The method of claim 8, wherein the weighting function is a time-varying periodic function synchronous with the PWM signal.

16. The method of claim 8, wherein the signal processing step is performed by a signal processing circuit containing at least one delta-sigma analog to digital converter.

17. The method of claim 16, wherein the at least one delta-sigma analog to digital converter has a sample rate of at least sixteen times the PWM frequency.

18. The method of claim 8, wherein the signal processing further comprises utilizing at least two analog to digital converters.

19. The method of claim 8, wherein an analog summing network obtains the processed voltage values further calculated by measuring a difference between the undriven winding and an average of the two driven windings for an analog to digital converter input.

20. The method of claim 8, wherein the motor is a three-phase permanent magnet motor.

21. A system for controlling motor switching in a sensorless BLDC motor having a set of three stator windings, the system comprising:
a controller unit comprising a control signal generator, a memory device, a processing unit, and a signal acquisition device;
a power stage having a plurality of switches in communication with the control signal generator, wherein the power stage receives a control signal from the control signal generator and a power signal from a power source, wherein the power stage drives two windings of the set of three stator windings with a pulse width modulation signal and leaves one stator of the three stator windings undriven;
wherein the signal acquisition device in communication with a voltage sense circuit receives a plurality of samples of a voltage on the undriven winding during an energized state of each pulse width modulation cycle, whereby a time interval for acquiring the plurality of samples is a window of time;
wherein the processing unit in communication with the signal acquisition device demodulates the voltage on the undriven winding; and
wherein the processing unit in communication with the power stage through the control signal generator and in communication with the memory device communicates with the power stage to change which two windings of the three stator windings are driven when the demodulated measured voltage surpasses a threshold stored on the memory device.

22. The system of claim 21, wherein the window of time spans a portion of the undriven voltage during an approximate second half of the energized state of the pulse width modulation signal, thereby isolating a portion of the voltage on the undriven winding more directly attributable to rotor position.

23. The system of claim 21, wherein the processing unit determines a deviation of the plurality of samples and defines the window of time as spanning a set of consecutive sampled voltages of the samples that vary less than a threshold percentage from a mean of the samples.

24. A system for controlling motor switching in a sensorless BLDC motor having a set of three stator windings, the system comprising:
a controller unit comprising a control signal generator, a memory device, a processing unit, a signal acquisition device, and an analog-to-digital converter;
a power stage having a plurality of switches and in communication with the control signal generator and a power source, wherein the power stage receives a control signal from the control signal generator and the power signal from the power source, wherein the power stage drives two windings of the set of three stator windings within the motor with a pulse width modulation signal and leaves one stator of the three stator windings within the motor undriven;
wherein the signal acquisition device in communication with the analog-to-digital convertor and a voltage sense circuit receives a first plurality of samples of a voltage on the undriven winding during an energized state of each pulse width modulation cycle, whereby a time interval for acquiring the plurality of samples is a first window of time;
wherein the signal acquisition device receives a second plurality of samples of a voltage on the undriven winding during a de-energized state of each pulse width modulation cycle, whereby a time interval for acquiring the plurality of samples is a second window of time;
wherein the processing unit in communication with the signal acquisition device demodulates the voltage on the undriven winding at least by calculating a difference between the first plurality of samples and the second plurality of samples; and
wherein the processing unit in communication with the power stage through the control signal generator and in communication with the memory device communicates with the power stage to change which two windings of the three stator windings within the motor are driven when the demodulated measured voltage surpasses a threshold stored in the memory device.

25. The system of claim 24, wherein the controller unit filters the first plurality of samples and the second plurality of samples with at least one delta-sigma analog to digital converter.

26. The system of claim 24, wherein the at least one delta-sigma analog to digital converter has a sample rate of at least sixteen times the PWM frequency.

* * * * *

UNITED STATES PATENT AND TRADEMARK OFFICE
CERTIFICATE OF CORRECTION

PATENT NO. : 8,994,306 B2  Page 1 of 1
APPLICATION NO. : 13/835101
DATED : March 31, 2015
INVENTOR(S) : Marc Kobayashi It is certified that error appears in the above-identified patent and that said Letters Patent is hereby corrected as shown below:

Title page, item (72) Inventors: "Olijaca" should be -- Oljaca --.

Signed and Sealed this
Eighth Day of September, 2015

Michelle K. Lee
*Director of the United States Patent and Trademark Office*